…

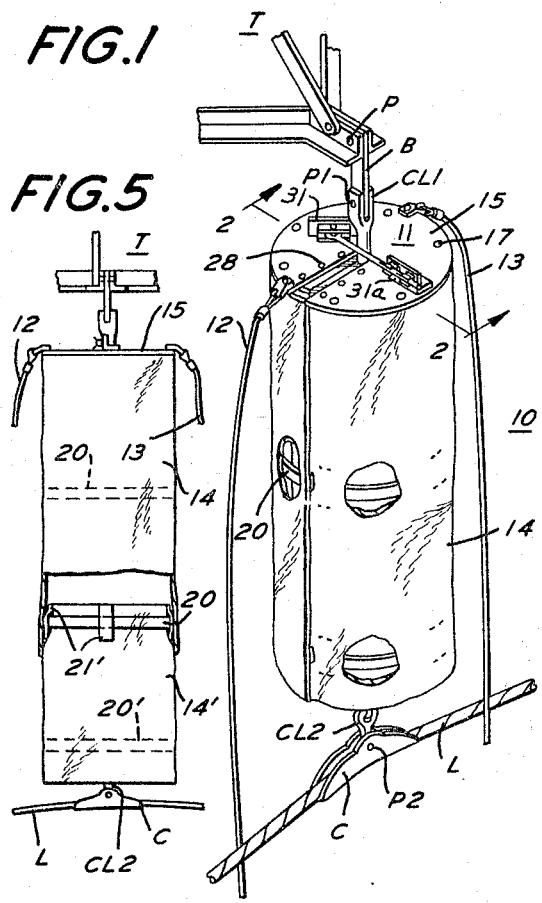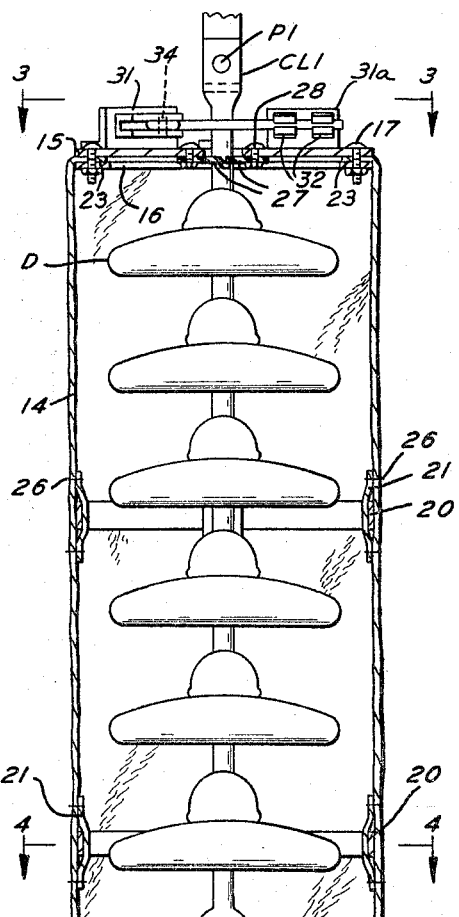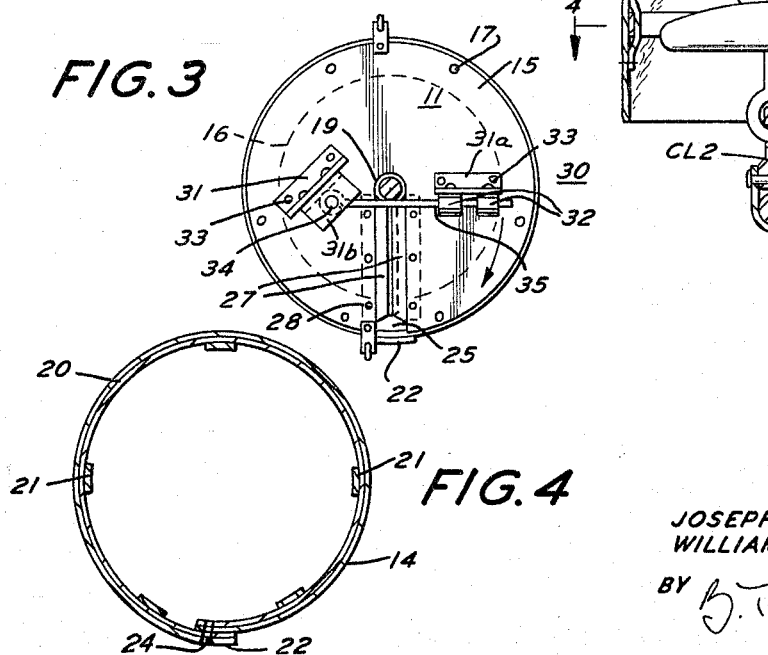
INVENTORS.
JOSEPH M. VAN NAME
WILLIAM G. MULLEN
ATTORNEY

United States Patent Office 3,270,120
Patented August 30, 1966

3,270,120
COVER FOR ELECTRICAL INSULATORS AND METHOD OF REMOVING SAME
Joseph M. Van Name, Stonybrook Drive, Blue Bell, Pa. 19422, and William G. Mullen, 1818 Sterigere St., Jeffersonville, Pa. 19401
Filed Sept. 29, 1965, Ser. No. 491,243
11 Claims. (Cl. 174—1)

This invention relates to a cover for use on insulators while painting electrical transmission and supporting structures for insulators.

Considerable difficulty has been encountered in the painting of metal transmission line towers due to the contamination with paint of the insulators supporting the conductor lines. The presence of paint on the insulators seriously reduces their insulating qualities. Considerable expense and risk are required to remove this paint from the insulators for restoration of their insulating qualities. In some instances the contaminated insulators have been replaced. The present invention seeks to remedy this problem.

The principal object of the present invention is to provide a protective cover for insulators of power transmission equipment that is simple and effective in use for preventing contamination of the insulators.

A further object of the present invention is to provide a protective cover for insulators of power transmission equipment that is easily installed and readily removable after use.

A further object of the present invention is to provide a protective cover for insulators of power transmission equipment that involves a minimum of risk in installation and removal after use.

A further object of the present invention is to provide a protective cover for insulators of power equipment that is durable and long lasting in service.

A further object of the present invention is to provide a protective cover for insulators of power equipment which can readily be put in place by one man, and which can be removed and lowered by one man on the ground.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view in perspective showing the protective cover in accordance with the invention in place on a string of disk insulators carrying an electric transmission line;

FIG. 2 is a vertical sectional view, enlarged, taken approximately on the line 2—2 of FIG. 1;

FIG. 3 is a horizontal sectional view taken approximately on the line 3—3 of FIG. 2;

FIG. 4 is a horizontal sectional view, taken approximately on the line 4—4 of FIG. 3; and FIG. 5 is a view in elevation showing provisions for accommodating a longer string of insulators, parts being broken away to show the details of construction.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings a tower end arm T is shown having a bracket B fastened thereto by pin P. A clevis CL1 is attached to the bracket B by a pin P1. The clevis CL1 is attached to disk insulators D and at the bottom of the insulator assembly a clevis CL2 is attached to a clamp C by a pin P2, the clamp being in supporting engagement with a transmission conductor line L. The foregoing structure is well known and in common use.

In accordance with the invention an insulator cover assembly 10 is provided comprising a top cover plate assembly 11, guide rope 12, release rope 13, and a substantially cylindrical skirt 14 which may be of synthetic sheet plastic, canvas, or other suitable material as desired.

The top cover plate assembly 11 is comprised of two plates, an upper plate 15 and a lower annular plate 16. The plates 15 and 16 have the top portion of the skirt 14 therebetween and hold the skirt 14 in gripped engagement therebetween by bolts 17 spaced at appropriate intervals inwardly of the peripheral edges of the plates 15 and 16. The skirt 14, at the locations 23 where the bolts 17 pass therethrough, can be reinforced or strengthened in any desired manner such as by grommets. The skirt 14 has cylindrical spring bands 20 which act to hold the skirt 14 outwardly and away from the sides of the disk insulators D. The bands 20 are disposed inwardly of the skirt 14 and fastened thereto by circumferential sheaths 21 which are secured to the skirt 14 by lines of stitches 26 which hold the bands 20 from vertical movement.

The bands 20 extend around and overlap at their ends. The skirt 14 has overlapping edges 22 to which the bands 20 are also fastened and which bands 20 hold the edges 22 in closed relation.

The top cover plate 15 and lower annular plate 16 have a slot 25 therein extending from the peripheral edge of the plates 15 and 16 through annular plate 16 and to the center portion of plate 15.

An opening 19 is provided at the inward termination of the slot 25 for the reception of the clevis CL1 when the cover assembly 10 is installed.

The slot 25 has rubber seal strips 27 therealong mounted on the underside of the plate 15, bolts 28 being provided to hold the seal strips 27 thereto and the slot 25 in the plate 16 being suitably wider to provide clearance for the seal strips 27. The seal strips 27 are made of elastic rubber or other suitable material. The seal strips 27 are in a closed or overlapping horizontal position to prevent paint from entering the slot 25 during the painting operation.

A latching assembly 30 is provided mounted on the top plate 15 and comprises a latch mount 31 having a bifurcated horizontal extension 31b held to the cover plate 15 by bolts 33. A pin 34 passes through and is retained in a vertical position in the extension 31b. A latch 35 is pivotally attached to the pin 34 and is capable of horizontal movement across the top of the plate 15. A pair of spring clips 32 are provided carried on a plate 31a which is fastened to the top plate 15 by bolts 33, the clips 32 normally holding the latch 35 in closed position.

In FIG. 5 an extension skirt 14' is shown which is similar in shape to the skirt 14. The skirt 14' has bands 20' mounted thereon by sheaths 21'. The uppermost ring of sheaths 21' is on the exterior of the skirt 14', and the other rings are interiorly disposed as in the skirt 14. The uppermost ring of sheaths 21' can then be joined by a common band to the lowermost ring of sheaths 21 on the interior of the skirt 14. Additional skirts 14' could be employed in tandem.

For windy conditions, the vertical edges of the skirt 14 and extension skirt 14' may be detachably held together by conventional snap fasteners (not shown). These are readily disengaged when the cover 10 is removed. The overlapping ends of the bands 20 and 20' may have holes (not shown) through which a light string may be passed and tied to hold them together.

These strings are such as to be readily broken during removal of the cover 10.

The mode of operation will now be pointed out.

With the latch 35 open the lineman lifts the cover assembly 10 over the insulator string D and slides the top cover assembly 11 over the top disk insulator D. He then spreads the spring bands 20 and drops the skirt 14 down over the remaining disk insulators D. The clevis CL1 passes into the slot 25 between the rubber seals 27 and is stopped in the opening 19. The latch 35 is then closed by pressing it into engagement with the spring clips 32 which thereby locks the clevis CL1 firmly into the opening 19. The release rope 13 and guide rope 12 are then dropped to the ground one on each side of the conductor L and can be used to further position the protective cover as desired.

Upon completion of the painting operation the lineman pulls down on the release rope 13, the tension on the rope 13 tilts the top cover plate assembly 11 and opens the latch 35, which permits the top cover plate assembly 11 to slide off the top disk insulator D.

During the descent of the top cover plate assembly 11, the bands 20 are forced open permitting the skirt 14 to disengage from the insulator string and the assembly 10 to fall to a position where the ropes 12 and 13 support it in pendant position from the transmission line L. This operation opens the snap fasteners holding the edge of the skirt 14, if these are employed, and breaks the string holding the ends of the bands together if that is used. From this pendant position the cover assembly 10 may be eased to the ground by use of the two ropes 12 and 13.

Although the cover assembly has been illustrated as applied to a string of disk insulators mounted in suspension it is to be understood that it is equally applicable to the same general type of insulator mounted at any angle and to other types of insulator components such as pedestal, post, cap-and-pin and bushing insulators.

We claim:
1. A protective cover for electrical insulators on support structures comprising
   a relatively rigid plate member having a central insulator mounting element receiving opening and a slot extending from said opening to the periphery of the plate member,
   a cylindrical insulator protective skirt of flexible material secured at one end to said plate member and extending from said plate member,
   said skirt having a longitudinal opening communicating into said slot,
   a releasable latching member carried on said plate member contiguous to said opening and releasably retaining the insulator support in said opening, and
   position controlling cords connected to said plate member for removing the cover from an insulator.
2. A protective cover as defined in claim 1 in which said protective skirt has a spring band carried thereby outwardly urging the skirt.
3. A protective cover for electrical insulators as defined in claim 1 in which
   flexible sealing means is provided along said slot.
4. A protective cover for electrical insulators as defined in claim 1 in which
   said releasable latching member includes a movable latch rod, and
   resilient holding members engaged by said rod.
5. A protective cover for electrical insulators as defined in claim 1 in which
   said skirt has a skirt extension removably carried thereby.

6. A protective cover for electrical insulators as defined in claim 5 in which
   said skirt extension has a spring band carried thereby outwardly urging the skirt extension into engagement with the skirt.
7. A protective cover for electrical insulators as defined in claim 1 in which
   said cords include a cord secured to the opposite side of said plate member from the peripheral terminal of said slot.
8. A protective cover for electrical insulators as defined in claim 7 in which
   said cords include a cord secured to the opposite side of said plate member from said first mentioned cord.
9. A protective cover for electrical insulators on support structures comprising
   a relatively rigid plate member having a central insulator support receiving opening and a slot extending from said opening to the periphery of the plate member,
   a cylindrical insulator protective skirt of flexible material secured at its upper end to said plate member and being pendant from said plate member,
   said skirt member having a vertical opening communicating with said slot,
   said skirt having a spring band carried thereby outwardly urging said skirt,
   a releasable latching member carried by said plate member having a latching rod extending transversely of said slot and resilient holding members engaged by said rod,
   and position controlling cords connected to said plate member for removing the cover from an insulator,
   said cords including a cord secured to the opposite side of said plate from the peripheral terminal of said slot, and
   a cord secured to said plate member contiguous to the peripheral terminal of said slot.
10. A protective cover as defined in claim 9 in which flexible sealing means is provided along said slot.
11. The method of removing from around and over an insulator aerially spacing electric transmission structures having a substantially horizontal component below and adjacent to said insulator and at a substantial elevation above ground a stripable cover having means for detachably engaging said insulator and two position controlling cords, one of which is a release cord operable to actuate said means for detaching said cover from engagement with said insulator, which comprises
   disposing said cords pendantly on respective sides of said component,
   pulling said release cord to release said cover and strip it from said insulator,
   permitting said cover to fall freely to a position below said component where it is pendant therefrom and restrained by the one of said cords which is looped over said component, and
   then easing said cover down to ground from said position by use of at least said one of said cords.

References Cited by the Examiner
UNITED STATES PATENTS

| | | | |
|---|---|---|---|
| 1,806,854 | 5/1931 | Hesson | 174—139 X |
| 2,163,790 | 6/1939 | Kerr | 174—5 |
| 2,946,841 | 7/1960 | Wagner | 174—139 |

FOREIGN PATENTS 385,699 1/1933 Great Britain.

LARAMIE E. ASKIN, *Primary Examiner.*